(12) United States Patent
Hestnes et al.

(10) Patent No.: US 6,778,686 B1
(45) Date of Patent: Aug. 17, 2004

(54) SENSING DEVICE AND A METHOD RELATING THERETO

(75) Inventors: Njård Hestnes, Heimdal (NO); Frank Robert Riedijk, RW Pijnacker (NL)

(73) Assignee: Fingerprint Cards AB, Gothenburg (SE)

( * ) Notice: Subject to any disclaimer, the term of this patent is extended or adjusted under 35 U.S.C. 154(b) by 0 days.

(21) Appl. No.: 09/622,347

(22) PCT Filed: Feb. 15, 1999

(86) PCT No.: PCT/SE99/00195

§ 371 (c)(1),
(2), (4) Date: Oct. 16, 2000

(87) PCT Pub. No.: WO99/41696

PCT Pub. Date: Aug. 19, 1999

(30) Foreign Application Priority Data

Feb. 16, 1998 (SE) ............................... 9800449

(51) Int. Cl.⁷ ................................................ G06K 9/00
(52) U.S. Cl. ..................................................... 382/124
(58) Field of Search ................................ 382/115, 118, 382/124–127; 902/3–6; 235/379, 380, 382, 382.5; 356/71; 345/365; 340/365, 5.83, 5.53; 310/311

(56) References Cited

U.S. PATENT DOCUMENTS 4,290,052 A * 9/1981 Eichelberger et al. ........ 341/33
4,539,554 A * 9/1985 Jarvis et al. ................. 310/311
5,325,442 A    6/1994 Knapp
5,430,381 A    7/1995 Dower
5,953,411 A * 9/1999 Farrell ......................... 340/5.83
6,055,324 A * 4/2000 Fujieda ........................ 382/124
6,507,662 B1 * 1/2003 Brooks ........................ 382/115

FOREIGN PATENT DOCUMENTS

DE    A1-19631569    2/1998

* cited by examiner

Primary Examiner—Vikkram Bali
(74) Attorney, Agent, or Firm—Birch, Stewart, Kolasch & Birch, LLP (57) ABSTRACT

The present invention relates to a capacitive sensing device (10) for sensing topological variations in the structure of an object such as e.g. a finger. The device comprises a sensing surface for receiving the object adjacent thereto and a number of sensor elements ($1_{1,1}, \ldots, 1_{x,y}$) arranged in at least two dimensions (x,y). The sensing device further includes controlling means (2,3) for providing control signals to the sensor elements ($1_{1,1}, \ldots, 1_{x,y}$) and for at least a number of the sensor elements at least two functionalities are available. The sensor elements can be brought to take on one of said at least two different functionalities, and the actual functionality of a sensor element is determined by said control signal. The invention also relates to a data carrier comprising such a capacitive sensing device, and to a method for use of such a device.

36 Claims, 5 Drawing Sheets

| $S_X$ AND $S_Y$ | $D_X$ AND $D_Y$ | ELEMENT FUNCTIONALITY |
|---|---|---|
| FALSE | FALSE | INACTIVE |
| FALSE | TRUE | TRANSMITTER |
| TRUE | FALSE | RECEIVER |
| TRUE' | TRUE | RECEIVER |

SENSING DEVICE AND A METHOD RELATING THERETO

This application is the national phase under 35 U.S.C. § 371 of PCT International Application No. PCT/SE99/00195 which has an International filing date of Feb. 15, 1999, which designated the United States of America.

FIELD OF THE INVENTION

The present invention relates to capacitive sensing of topological variations in the structure of an object. The invention particularly relates to a sensing device sensing topological variations in the structure of a finger or a fingertip, and to a so-called fingerprint recognition system.

STATE OF THE ART

Various sensing devices, particularly devices intended for sensing topological variations in the structure of a finger or a fingertip are known, which are based on capacitive sensing. One capacitive sensing device is known from U.S. Pat. No. 5,325,442. This device comprises an array of sensor elements which are connected to a drive circuit. Each sensor element comprises a sense electrode, and the array of sense electrodes is covered by a dielectric material defining a sensing surface. Each sensor element includes a switching device which is connected to its sense electrode which is actively addressable by the drive circuit controlling the operation of the switching device. In this manner, a predetermined potential can be applied to the sense electrode. The sensing device still further includes a sensing circuit for sensing a capacitance produced by individual finger surface portions in combination with respective sense electrodes when a finger is placed over the sensing surface. Active addressing of the sensing elements is enabled through the switching devices in each sensing element, which is intended to simplify the driving of the array. It is an object of the invention described in U.S. Pat. No. 5,325,442 to reduce the number of connections and the number of addressing conductors, as compared to other devices. This device is based on reflective sensing.

It could be said that a drawback of the device of U.S. Pat. No. 5,325,442 is that it offers a relatively low sensitivity, in that only one sensor element at a time can be used for sensing. An additional drawback of this device is that since one and the same element is used for transmitting and sensing, there is a risk that the element, when transmitting, will influence the element when sensing, in an undesired manner, by means of, for example, parasitic capacitances. Another problem with this device might be that sweat remaining on the sensor surface could influence the sensing.

SE-C448 408 also shows a capacitive sensing device which comprises a number of sensor elements arranged in a two-dimensional matrix. The object of the invention, as disclosed in said document, is to provide a device enabling a faster sensing and a device reducing the risk of the sensed pattern being influenced by the object, i.e. the finger, moving during the sensing operation. This device is also based on reflective sensing principles.

Still another sensing device is disclosed in EP-A-0 791 899. This device is based on capacitive sensing using direct sensing principles.

However, all sensing devices which are known so far suffer from drawbacks as far as the sensitivity is concerned, i.e. a higher sensitivity is sometimes needed, and furthermore, the sensor area, which particularly contains silicon, which is expensive, is not used as efficiently as would be desired. Furthermore, known sensing devices suffer from the drawback of being inflexible in use.

SUMMARY OF THE INVENTION

What is needed is therefore a sensing device which can be given the required sensitivity, which is efficient, and which is cost-efficient from a fabrication point of view. A sensing device is also needed which can be made small and still be highly efficient. Particularly, a sensing device for sensing topological variations in the structure of a finger or a fingertip is needed which meets the above-mentioned requirements, as well as a fingertip pattern or a fingerprint recognition device which here means a device comparing stored information about the variations in the topological structure of a finger with the corresponding information of a finger of a user wanting access to something.

In addition, what is needed is a sensing device with increased sensitivity as compared to prior art, with the possibility of adaptively controlling the sensitivity of the device from case to case. Also, in the case of a device with transmitting elements and sensing elements, what is needed is a sensing device in which the sensing elements can be shielded or insulated from the transmitting elements.

A method is also needed through which the topological variations in the structure of an object can be detected in an appropriate way, with the desired sensitivity and also in an easy and cost-efficient manner.

Therefore a capacitive sensing device is provided which is intended for sensing topological variations in the structure of an object. One example of such an object is a finger used in finger(tip) pattern recognition systems etc. to establish whether a user should be given access to something or not. Particular implementations will be described below. The sensing device comprises a sensing surface for receiving an object adjacent thereto and a number of sensor elements which are arranged in two dimensions in a matrix or in an array. The sensing device comprises controlling means for providing control signals to the sensor elements. At least a number of the sensor elements can be controlled or brought to have or to assume one of at least two different functionalities, and the actual functionality of a sensor element is controlled or determined by said control signals. Any of said at least two functionalities can be assumed by any one of the controllable sensor elements, and any other of said at least two functionalities can be assumed by any one of the other controllable sensor elements.

In a particular embodiment, any of said at least two functionalities can be assumed by any one of the controllable sensor elements, and any other of said at least two functionalities can simultaneously be assumed by any one of the other controllable sensor elements.

In addition, in one embodiment, any of said at least two functionalities can be assumed by any number of said controllable sensor elements, and any other of said at least two functionalities can be assumed by any number of the remaining controllable sensor elements.

The present invention also enables any of said at least two functionalities to be able to be assumed by any number of said controllable sensor elements, and any other of said at least two functionalities can simultaneously be assumed by any number of the remaining controllable sensor elements.

The functionalities available for the at least a number of controllable sensor elements which can be brought to take one of at least two different functionalities comprise a driving functionality in which a sensor element acts as a transmitting element and a sensing functionality in which a sensor element acts as a receiving element. This means that the sensor elements, or at least a number of the sensor elements, are bi-directional, which means that they can be selected to act either as a transmitter or as a receiver.

Due to the flexibility of the sensing device of the present invention, the sensitivity of the device can be varied adaptively from case to case, since the number of transmitting elements as well as the number of sensing elements can be varied from case to case. Additionally, since any element can be used as transmitting element, with any of the other elements being used as the corresponding sensing element, the distance between transmitter and receiver (sensor) can be varied at will, thus raising the level of isolation between transmitter and receiver. In addition, since the distance between the transmitting element(s) and the receiving element(s) can be chosen freely, the problem of remaining sweat on the sensor surface can be obviated.

In a further embodiment, at least a number of the controllable sensor elements can be controlled to assume a third functionality. Preferably, all sensor elements are operable in all said three functionalities and can thus be controlled to have any of at least three different functionalities.

Suitably, said third functionality is an insulating functionality in which a sensor element is inactive, or not selected. Thus, all sensor elements can be controllable, and each sensor element can be controlled to act as a receiving element, a transmitting element, or to be in an insulating, inactive mode, in which mode the element is not selected. This makes it possible to even further raise the sensitivity of the sensing device.

In an alternative embodiment, for all sensor elements the functionalities which are available comprise a sensing functionality as referred to above and the inactive, insulating functionality in which the sensor element is inactive, which also can be expressed as the sensing element not being selected at all.

In one embodiment, at least a number of the sensor elements are controllable via the control signals, and can be brought to act either as a receiving element, a transmitting element or they can be inactive, particularly not selected. In a particularly advantageous embodiment, all sensor elements can be controlled so as to have any of the above-mentioned functionalities, i.e. receiver, transmitter or inactive. Advantageously, however, all sensor elements are operable in at least two different modes and they can be selected to have one of at least two different functionalities.

In a preferred embodiment, the sensor elements are arranged in a two-dimensional matrix comprising X rows and Y columns. In a particular embodiment some of the sensor elements are selected to act as transmitting elements whereas some of the other sensor elements are selected to act as receiving elements. Advantageously, the number of transmitting elements exceed the number of receiving elements. According to this embodiment, the transmitting elements transmit pulsating voltage signals which are provided to the object, for example the finger, the variations in topological pattern of which is to be sensed, and the receiving elements measure the capacitively transferred signal which is reflected back to the sensing device. In other words, the device acts as a reflective sensor.

In an alternative embodiment, conducting means are provided for establishing an ohmic contact between the object and the sensing device. In this embodiment, which relates to a sensor using direct sensing principles, the conducting means acts as a transmitting electrode and a number of sensor elements are selected to act as receiving elements. The remaining sensor elements are selected to be inactive or in other words not selected at all and in this embodiment no elements are selected to act as transmitting elements. Particularly the conducting means is arranged externally and connected to the sensing device. Advantageously however, the conducting means is arranged externally to the sensing matrix but within the sensing device itself.

In a preferred embodiment, via the controlling means a first operational mode can be selected in which the sensing device acts as a reflective sensor or alternatively a second operational mode can be selected in which the sensor acts as a direct sensor. In the latter case conducting means, e.g. of metal, are provided in an appropriate way to enable the establishment of an ohmic contact between the sensing device and the finger or whatever be the object the pattern of which is to be sensed.

The sensor matrix, or at least some of the sensor elements, is/are programmable and the number of sensor elements acting as transmitting elements can be controlled as well as the actual positions of the transmitting elements can be controlled. Thus the functionalities of the sensor elements and the operational mode of the sensing device are controllable (programmable) and can be adapted to the actually prevailing circumstances, e.g. as for as the object is concerned, the ambient conditions etc.

In one embodiment, the controlling mean comprise a first and a second controlling arrangement, each providing at least one digital control signal to each of a number of sensor elements wherein said input signals determine the functionality of the sensor elements. In a particular embodiment, control signals are provided groupwise to a number of sensor elements, e.g. a sub-array or similar of sensor elements. In that case, not all sensor elements are separately controllable, but some of them can be controlled groupwise or elements can be arranged in different groups and the entire control procedure is carried out through controlling groups of sensor elements.

In an exemplary embodiment, the first controlling means comprise a dual shift register and the second controlling means comprise a second dual shift register. The length of the first dual shift register corresponds to the number of rows, whereas the length of the second dual shift register corresponds to the number of columns. Each of the shift registers provide digital control signals via a row interface and a column interface respectively to the sensor elements being controlled, and the result of the control signals provided to the respective sensor element (or group of sensor elements) determines the functionality of the respective sensor element (group of sensor elements).

Each dual shift register provides two digital control signals to each sensor element that is to be controlled. One of said signals indicates whether the sensing functionality is to be activated, whereas the other indicates whether the driving functionality is to be activated. A particular functionality of a sensor element is only activated if the control signals from both dual shift registers actually indicate one and the same functionality for the concerned sensor element.

In a preferred embodiment, the receiving functionality has priority over the transmitting functionality so that if the control signals from both shift registers indicate activation of both the sensing and the driving functionality for a sensor element, the sensor element will act as a receiver.

A method of sensing topological variations in the structure of an object which is received adjacent a sensing surface of a capacitive sensing device is also provided. The capacitive sensing device includes a number of sensor elements arranged in at least two dimensions. The method comprises providing control signals by means of which at least one of the sensor elements is controlled to have the functionality of a receiving element and at least one of said sensor elements is controlled to have the functionality of a transmitting element, generating capacitive or conductive signal(s) to the object via said transmitting element(s), detecting the capacitance between a number of different locations on the object and different receiving elements. The method also comprises using the capacitive signals received in the receiving elements for determining the topological pattern in the structure of the object, and generating an (analogue) output signal describing the topological pattern.

In one embodiment of the method, at least one of said sensor elements is activated to have the functionality of a receiving element, while simultaneously the at least one of said sensor elements is activated to have the functionality of a transmitting element.

In one embodiment the method further comprises the step of storing the information about the topological pattern of the structure of, for example, a finger of the owner of the device or the user entitled to get access to/by the device. Still further the method may comprise the steps of using the sensing device to determine the actual topological pattern of an object at another, later, occasion, comparing the stored information with the actual topological pattern, and generating an output signal indicative of the correspondence between the stored information and the actual information. This output signal can of course take a number of different forms. According to one embodiment an output signal is only generated if the correspondence exceeds a given value or vice versa.

Therefore, a data carrier is also provided, which includes a finger(tip) recognition device comprising a sensing device with a number of controllable sensor elements for sensing the variations in the structure of the topological pattern of a finger or fingertip, storing means for storing such information about the finger/fingertips of entitled user(s), comparing means for comparing input finger/fingertip pattern information of a user attempting/wanting access to, or by, said data carrier and means for generating an acceptance signal if the correspondence between stored information and finger/fingertip pattern information of a user wanting access, at least meets some predetermined criterium or at least reaches a predetermined level. Alternatively a rejection signal may be generated which indicates rejection of the accessing user, i.e. that the correspondence between the stored finger(tip) pattern information is insufficient or particularly lower than a predetermined level, otherwise access is automatically provided. The sensor device is capacitive and comprises controlling means for providing control signals to the sensor elements, and the functionality of each of at least a number of the sensor elements can be selected via the control signals. At least two functionalities are available to, or can by means of the control signals be assumed by, at least a number of said sensor elements.

According to the invention, any of said at least two functionalities can be assumed by any one of the controllable sensor elements, and any other of said at least two functionalities can be assumed by any one of the other controllable sensor elements.

Suitably, any of said at least two functionalities can be assumed by any one of the controllable sensor elements, and any other of said two functionalities can simultaneously be assumed by any one of the other controllable sensor elements.

In one embodiment, any of said at least two functionalities can be assumed by any number of said controllable sensor elements, and any other of said two functionalities can be assumed by any number of the remaining controllable sensor elements.

Preferably, any of said at least two functionalities can be assumed by any number of said controllable sensor elements, and any other functionality can simultaneously be assumed by any number of the remaining controllable sensor elements.

In a particular embodiment the data carrier is portable and comprises a personal card or similar. It can also be implemented in a computer, a (mobile) telephone, a car, for providing access to controlled areas or localities, credit cards, PCMCIA cards for portable equipment etc. With the controlling means each (or a number of) sensor element can be brought to act as a receiving (sensing) element or to act as a transmitting (driving) element or to be inactive.

According to one aspect of the invention, a number of elements are selected to act as transmitters whereas a number of sensor elements are selected to act as receivers and the sensing of the topological pattern of a finger(tip) is effected through sensing the signals reflected back from a number of locations at the finger which means that the sensing device acts as a reflective sensor.

In a further embodiment, at least a number of the sensor elements can be controlled to assume a third functionality. Preferably, each sensor element can be controlled via the control means to assume each of said three functionalities.

Suitably, said third functionality is an insulating functionality, in which a sensor element is inactive, or not selected.

Thus, all sensor elements can be controllable, and each sensor element can be controlled to act as a receiving element, a transmitting element, or to be in an insulating, inactive mode, in which mode the element is not selected. This makes it possible to even further raise the sensitivity of the sensing device in the data carrier according to the invention.

Alternatively, all sensor elements are selected to act as receivers except for the ones being inactive, and conducting means are arranged to provide an ohmic contact with the finger, which conducting means then acts as a transmitter and direct sensing is implemented. In a preferred embodiment, the sensing device supports reflective as well as direct sensing principles and the same sensing device can be used in both sensor modes.

As can be seen, the sensor device is highly flexible, and since the sensor elements are bi-directional (in addition thereto they can be inactive) the sensor area, which for example is made of expensive silicon, can be used efficiently. Furthermore, a larger area is available for transmitting elements which permits a higher sensitivity. Sensor elements which are not active, i.e. sensor elements which are not selected or selected to be inactive, can shield or insulate sensor elements acting as receivers (sensing elements).

Through making the sensing device, or the sensor elements of the sensor device, programmable, the sensitivity can be adjusted depending on the particular circumstances or, for example, in dependence of different properties of the fingers or the fingertips such as for example the thickness of the skin, the degree of humidity or the dryness. The reflective sensing principle or the direct sensing principle can be selected e.g. depending on what is best in a particular situation etc.

The flexibility of the device is high and it is also possible to implement partial scanning such as activating one single column or one single row for detecting the presence of a finger, for rereading important information to save acquisition time or to minimize microprocessor storing requirement; alternatively, of course, two rows or two columns or any combination may be used, such as e.g. any part of the sensing area.

BRIEF DESCRIPTION OF THE DRAWINGS

The invention will in the following be further described in a non-limiting way and with reference to the accompanying drawings in which.

DETAILED DESCRIPTION OF THE INVENTION

Figure 1:
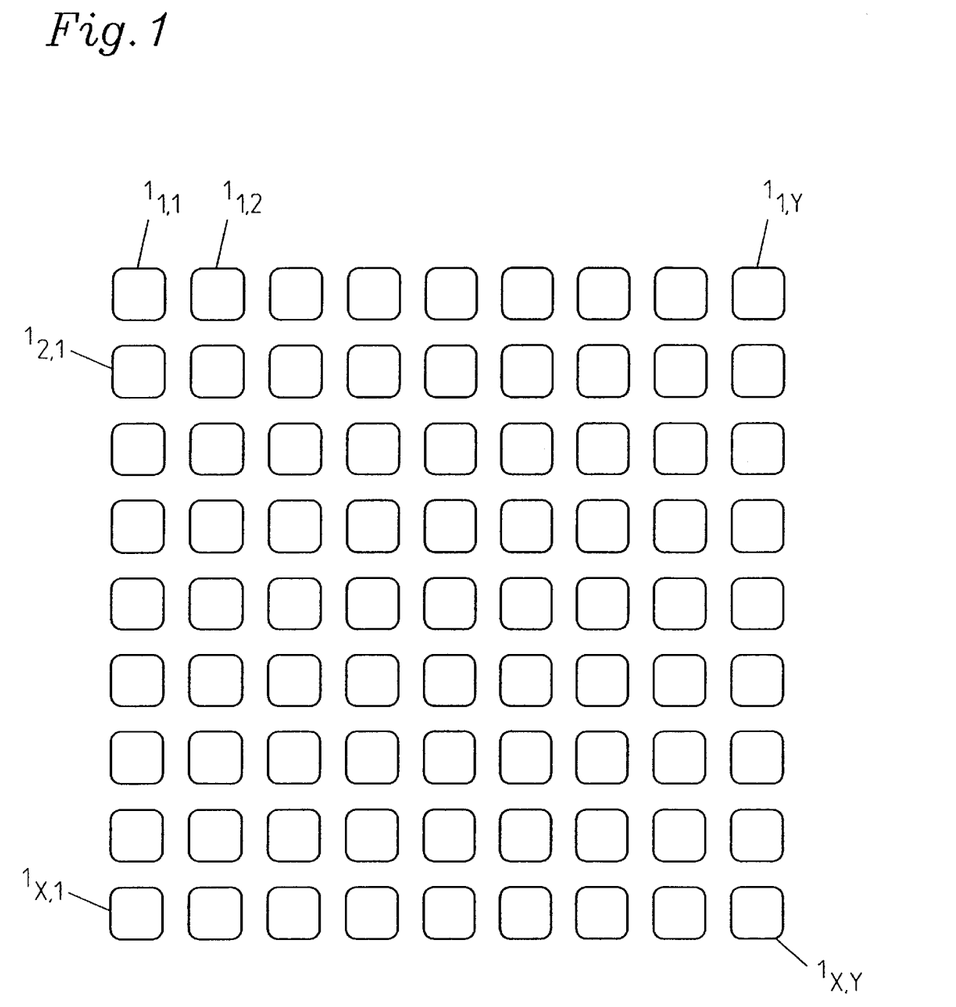
FIG. 1 in a simplified manner schematically illustrates a number of sensor elements arranged in a two-dimensional matrix, FIG. 2 schematically illustrates one embodiment of a sensing device according to the invention, FIG. 3 schematically illustrates a block diagram of a sensor element.

In FIG. 1 a two-dimensional matrix is illustrated, which comprises X rows and Y columns of sensor elements $1_{1,1}$, $1_{1,2}$, ..., $1_{x,y}$. The sensor matrix may take different forms, the number of rows X may be the same as the number of columns Y, but the number of rows X may also differ from the number of columns Y. Advantageously, the sensor elements, also called pixels, are arranged in such a manner that there are between 300–500 dpi (dots per inch) although the invention by no means is limited thereto. For example, there may be between 100 and 300 elements in either direction. In one exemplary embodiment, X and Y both are 144, and the sensor elements may be arranged at a distance of approximately 70 μm from each other, approximately corresponding to 367 dpi. These figures are however merely given for exemplifying reasons, how close the sensor elements are arranged, and how many they are, is among others given by the sensitivity requirements. For example, if the sensing device is used as a finger(tip) sensor, i.e. a sensor for sensing the topological variations in the structure of a portion of a finger, particularly a fingertip, the size that is required is different depending on the size of the fingers, for example for a child a smaller sensing area is required than the sensing area needed when a sensor is used for an adult. According to the invention, the sensor elements $1_{1,1}$, ..., $1_{x,y}$ are suitably bi-directional, and each sensor element, or at least a number of them, can be controlled so as to act either as a receiver or as a transmitter. In this manner, the sensing surface of the sensor can be used and adapted in a very efficient manner.

In a preferred embodiment, the sensing device consists of a semiconducting chip (e.g. of Si) comprising a number of different layers. Advantageously, one layer is arranged on the top providing for some shielding (e.g. electrical shielding). However, various alternatives are possible.

Figure 2:
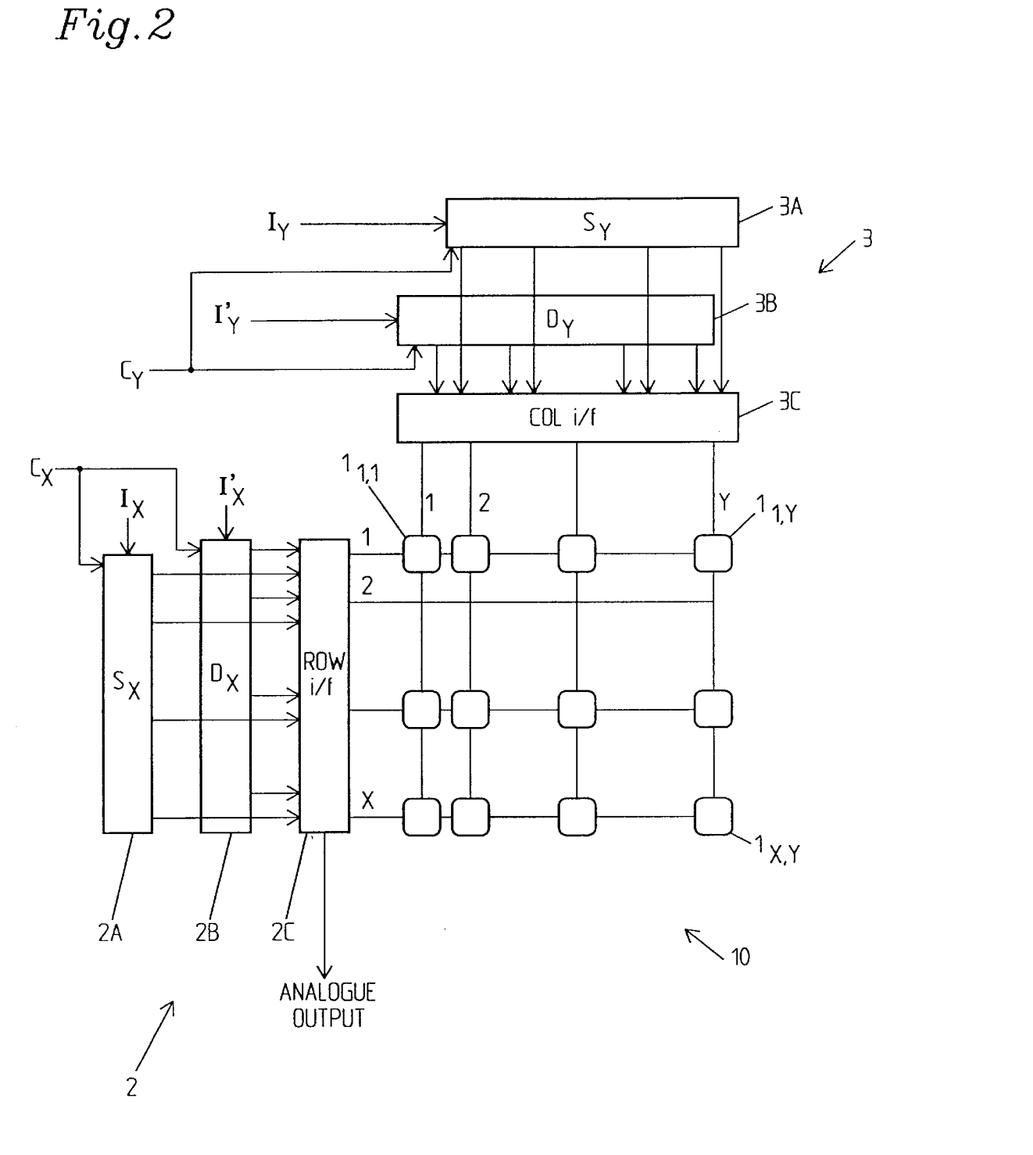

FIG. 2 illustrates a sensing device 10, comprising a number of sensor elements $1_{1,1}$, ..., $1_{x,y}$ as illustrated in FIG. 1. The bi-directional sensor elements can be controlled to act either as a receiver (corresponding to a sensing functionality), a transmitter (corresponding to a driving functionality) or they may be inactive. The sensor elements which are in the inactive functionality will act as insulating elements for other elements, which will be described in more detail below.

First controlling means 2 are arranged for controlling the functionality of the sensor elements in the X direction (row-wise), whereas second controlling means are arranged to provide control signals to the sensor elements in the Y direction (column-wise). The first and the second controlling means 2,3 respectively each comprise a dual shift register 2A,2B;3A,3B communicating via a row interface 2C and a column interface 3C respectively with the sensor elements. Two digital control signals (X direction digital control signals forming binary inputs to the shift register) $I_x$, $I_x'$ are provided to the dual shift register 2A, 2B one indicating the selection of the sensing functionality in the X direction, $S_x$, which may be active or not, whereas the digital control signal $I_x'$ indicates whether the driving functionality $D_x$ is to be activated or not.

In FIG. 2, $C_x$ is a shifting signal which in a manner known per se is used for shifting the data content in the register in the x-direction; $C_y$ in a similar manner is the shifting signal for the other shift register. A selected configuration of transmitters and receivers can thus be shifted in an easy manner.

Via the row interface 2C, two digital signals $I_x$, $I_x'$ are thus provided to each sensor element. The corresponding operations take place in the dual shift register 3A, 3B which is provided with Y direction digital control signals $I_y$, $I_y'$ indicating selection or non-selection of the sensing functionality $S_y$ in the Y direction and the selection or non-selection of the driving (transmitting) functionality $D_y$ in the Y direction. Thus, to each sensor element four digital signals are presented and to select the functionality of a sensor element, the same functionality for both the X and the Y selection lines have to be selected. This will be further described with reference to FIG. 4.

Figure 3:
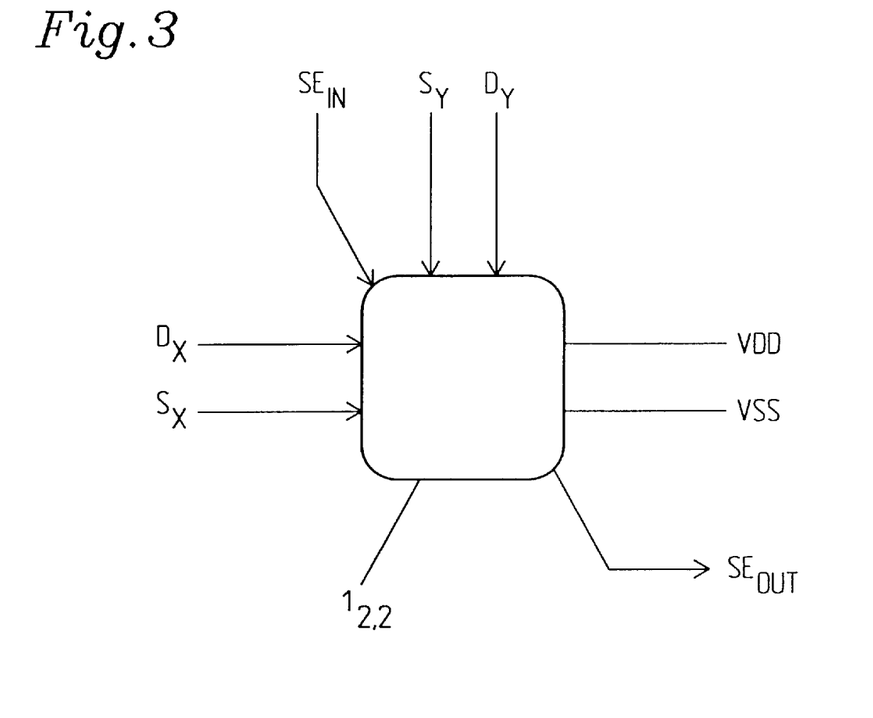

FIG. 3 shows one sensor element $1_{2,2}$ (for example). The signals $S_x$, $S_y$ control whether the sensor element is to be active as a receiver and $D_x$ and $D_y$ correspondingly control whether the driving functionality is to be activated. $V_{DD}$, $V_{SS}$ indicate the power supply. A sensor element output signal $SE_{OUT}$ is provided when the sensing functionality of the sensor element $1_{2,2}$ has been selected. In order to make the sensor element act as a transmitter, instead a pulsating voltage signal $SE_{IN}$ is provided to the element.

Figure 4:
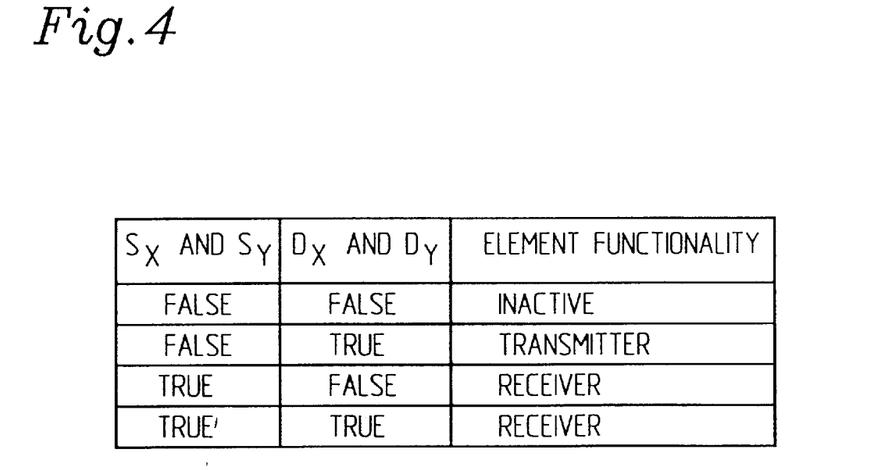
FIG. 4 is a table illustrating the selected functionality of a sensor element as a result of input control signals.

As referred to above, in order to select the functionality of a sensor element, both X and Y selection lines have to be activated in one and the same manner, as schematically illustrated in the table of FIG. 4. If thus the binary signals $S_x$ and $S_y$ indicating the receiving, or sensing, functionality do not both indicate "sensing" (receive), i.e. $S_x$ AND $S_y$ is false as well as the binary signals $D_x$ and $D_y$ indicating the transmitting or driving functionality likewise do not both indicate drive ($D_x$ AND $D_y$=False), the functionality of the sensor element will be that the sensor element is inactive, or in other words, the element is not selected. As mentioned above, in this functionality the element will act as a shielding or insulating element.

If, on the other hand, $S_x$ AND $S_y$ is false, meaning that the sensing or receiving functionality is not selected in both directions whereas the transmitting functionality $D_x$ AND $D_y$ is true, i.e. selected in both directions, the functionality of the sensor element will be that it acts as a transmitter (i.e. as a driver). If on the other hand $S_x$ AND $S_y$, i.e. the sensing functionality selection lines, are both active whereas $D_x$ AND $D_y$ is false, the functionality of the sensor will be that it acts as a receiver.

Finally, if both $S_x$ AND $S_y$ and $D_x$ AND $D_y$ are true, i.e. both the receiving functionality and the transmitting functionality are selected in both directions, the sensor element will act as a receiver, since in this particular embodiment the receiving functionality is given priority over the transmitting functionality.

According to the invention, it is thus possible to select which (and how many) elements are to act as receivers, as transmitters and which are to be inactive, and in this manner the size and the sensitivity of the sensing device can be completely controlled. In an advantageous embodiment, the sensor matrix is programmable in such a way that the sensitivity can be adjusted depending on different properties of a fingertip, such as for example the thickness of the skin, the dryness, the humidity, the size of the finger etc. One or more sensor elements can be selected to operate as receivers, whereas the remaining sensor elements can be selected to operate as transmitters or to be inactive. Inactive sensor elements surrounding a receiving sensor element particularly provide a shield, or insulation, to sensor elements acting as receivers. In this way, the invention provides for an even higher level of raised sensitivity of the sensing device, since sensing elements canbe, for example, surrounded by shielding or insulating elements. These elements will have the function of insulating or shielding the sensing elements from the transmitting elements.

Since, in a preferred embodiment, any of the controllable elements can be controlled to assume any of the three functionalities, the invention provides extremely high flexibility for sensing, as well as a raised level of sensitivity, since the number of transmitting and receiving (sensing) elements respectively, can be varied, with the possibility of providing an insulating "screen" around the sensing elements.

Activation of elements may take place element by element row-wise, column-wise, diagonally or in any desired order. Elements can also be activated in parallel, i.e. both shift registers may be shifted simultaneously. It is also possible to select which element is to be started with and which element will be the last etc.

A high sensitivity can be provided in that the area that is available for transmitting sensor elements is larger.

It is also possible to control the number of, and the location of sensor elements of one or the other kind.

Furthermore, through the programmability as provided for through the present invention, it is possible to perform partial scans, for example for one single column or one single row (or any other desired number of columns/rows) for detecting the presence of a finger or similar or for the rereading of important information to save acquisition time and to minimize the storing requirements of the microprocessor (not shown) to which the (analogue) output signal is provided. If one or more sensor elements are selected to have a transmitting functionality, and a number of sensor elements are selected to act as receivers, the sensing device operates as a reflective sensor.

Figure 5:
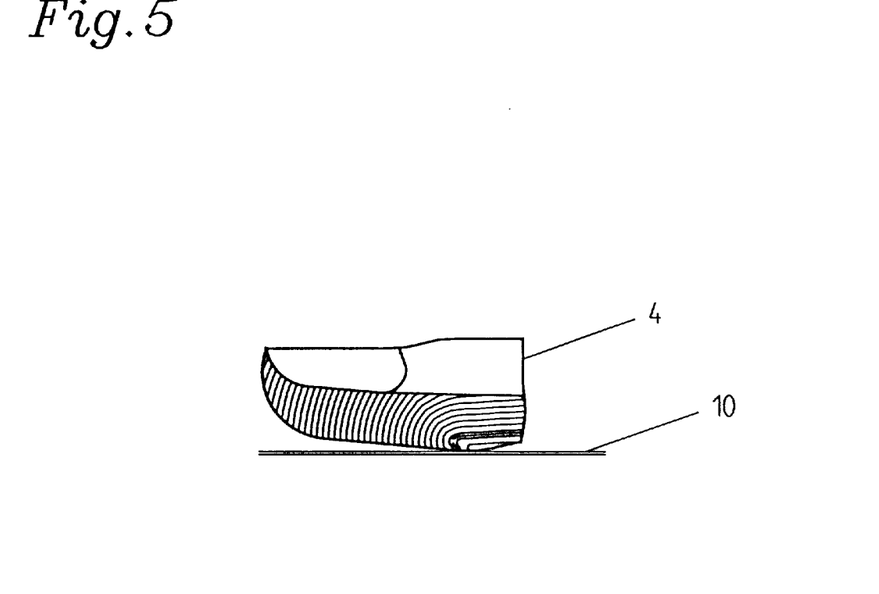
FIG. 5 is a schematical cross-sectional view of a sensing device on which a finger is placed, FIG. 6 schematically illustrates a sensing device adjacent to which a portion of a finger is arranged implementing reflective sensing.

In FIG. 5 a sensing device 10 is schematically illustrated on which a finger 4 is placed. Advantageously the thickness of the sensing device is smaller than 0.5 mm. In alternative embodiments the sensing device may be thicker; this depends on the implementation, the fabrication technology etc.

Figure 6:
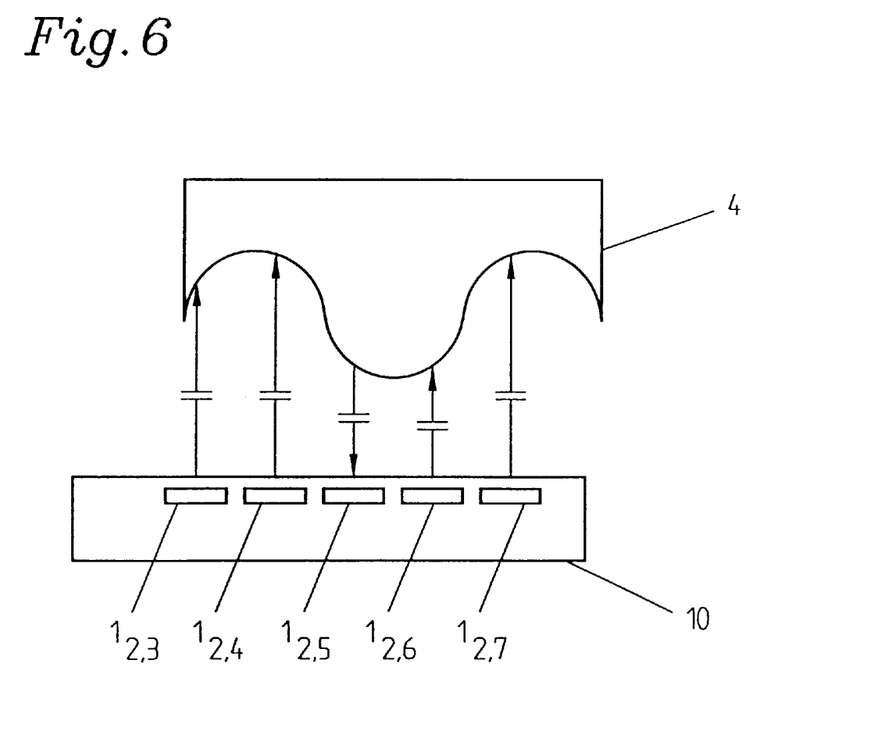

FIG. 6 schematically illustrates a small portion of a finger comprising valleys and ridges and the sensing device 10 comprising sensor elements $1_{2,3}$, $1_{2,4}$, $1_{2,5}$, $1_{2,6}$, $1_{2,7}$ which are explicitly illustrated. In this particular embodiment it is supposed that sensor elements $1_{2,3}$, $1_{2,4}$, and $1_{2,6}$, $1_{2,7}$ have been selected to act as transmitters whereas sensor element $1_{2,5}$ has been selected to act as a receiver. Thus pulsating voltage signals are provided to the finger by the transmitting elements and the receiving element $1_{2,5}$ detects the reflected capacitive signal.

By way of example only, a brief description of a principle of a sensing element which may be used in connection with the invention will be given below. It should, however, be understood that a wide variety of different sensor solutions may be applied within the scope of the present invention.

As shown in FIG. 6, each element or pixel comprises a top capacitive plate. When a pixel is in its driving state, this top capacitive plate is driven with a signal of 0–5 Volts, This signal will enter the skin, and will be received by the sensing pixel(s). The more pixels activated to the driving state, the stronger the signal in the skin will be. The pixel is also equipped with a amplifier, which is disabled and powered down in this state.

When a pixel is in its sensing state, the top capacitive plate is coupled to the pixel amplifier which is enabled and powered-up. The amplifier will ground the pixel virtually, so all the signal in the finger can be measured. The signal of the amplifier is selected by X-Y logic, and may be sent to a central amplifier or some other central processing means.

When a pixel is in its inactive state, the top capacitive plate is floating, that is not connected to the driving signal of 0–5V or to the amplifier. The amplifier will be disabled and powered-down. The finger will thus only see the parasitic capacitance in the pixel.

Figure 7:
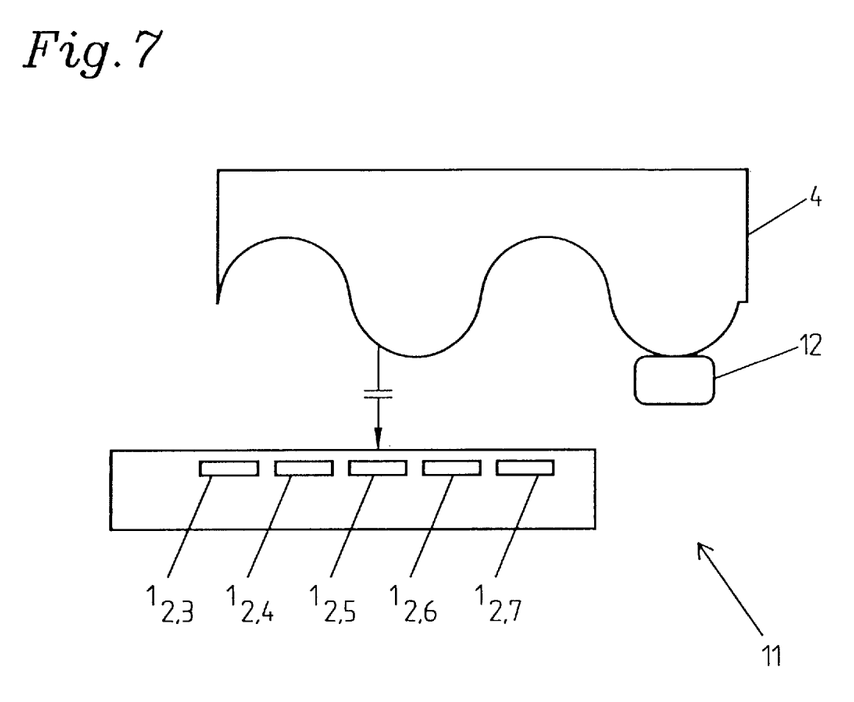
FIG. 7 is a schematical cross-sectional view similar to that of FIG. 6 including conducting means intended for direct sensing.

FIG. 7 is a figure similar to that of FIG. 6 showing an alternative sensing device 11. In this embodiment separate conducting means 12 is arranged to provide an ohmic contact with the finger 4. The separate conducting means 12 here acts a transmitting electrode. All sensor elements are selected to act either as receivers or to be inactive. The sensing device 11 can be programmed to operate either using direct sensing principle or using reflective sensing principles.

Thus, according to one preferred embodiment the invention sensing device can be programmed to act either as a reflective sensing device or as a direct sensing device if some kind of additional conducting means are provided having the functionality of a transmitter. In a preferred embodiment, the same application specific integrated circuit (ASIC) is used for different sensor designs if such an extra transmitting connection (12) is implemented on the package. In FIG. 7, it is supposed that sensing element $1_{2,5}$ is selected to act as a receiver whereas the remaining elements $1_{2,3}$, $1_{2,4}$, $1_{2,6}$, and $1_{2,7}$ are inactive at a particular moment.

Although not explicitly shown it should be clear that amplifying means are provided for amplification of the sensed signals, but this is supposed to be known in the art, and can be provided for in different manners.

In alternative embodiments, the sensor elements are arranged in more than one array to each of which arrays separate (or common) controlling means are provided. This will however not be further described herein since it should be clear to the man skilled in the art how such an embodiment would function.

Still further, the sensor elements can be arranged in three dimensions. Also in this case the functioning would be substantially the same. A difference will lie in the fabrication of the device. Further implementations are enabled and a still wider flexibility will be provided.

In a particular embodiment the sensing device is provided in a data carrier which comprises processing means and storing means for storing finger(tip) information of a user or particularly an owner of the data carrier, e.g. a card, telephone, computer; or more generally a user entitled to use the card or the device in which the sensing device is incorporated. Such a data carrier is more thoroughly described in EP-A-0 085 680, which hereby is incorporated herein by reference. Processing means are provided to compare the finger(tip) pattern information of a user trying to get access to the data carrier or the device in which the data carrier is incorporated and said information is compared to the stored information of the entitled user(s). If the correspondence exceeds or reaches a predetermined degree of correspondence, an acceptance signal is provided or access is automatically provided. This can be provided for in any convenient manner depending on the relevant implementation.

The invention is not limited to the explicitly shown embodiments, but can be varied in a number of ways within the scope of the claims.

What is claimed is:

1. A capacitive sensing device (10;11) for sensing topological variations in the structure of an object such as for example a finger (4), said device (10;11) comprising a sensing surface for receiving the object (4) adjacent thereto, a number of sensor elements ($1_{1,1}, \ldots, 1_{x,y}$) arranged in two dimensions (X,Y), controlling means (2,3) for providing control signals to the sensor elements ($1_{1,1}, \ldots, 1_{x,y}$), with at least a number of the sensor elements ($1_{1,1}, \ldots, 1_{x,y}$) being controllable to assume one of at least two different functionalities as controlled by the control signals, characterized in that any of said at least two functionalities can be assumed by any one of the controllable sensor elements, and any other of said at least two functionalities can be assumed by any one of the other controllable sensor elements.

2. A capacitive sensing device (10;11) according to claim 1, in which any of said at least two functionalities can be assumed by any one of the controllable sensor elements, and in which any other of said at least two functionalities can simultaneously be assumed by any one of the other controllable sensor elements.

3. A capacitive sensing device (10;11) according to claim 1 or 2, in which any of said at least two functionalities can be assumed by any number of said controllable sensor elements, and in which any other of said at least two functionalities can be assumed by any number of the remaining controllable sensor elements.

4. A capacitive sensing device (10;11) according to claim 1 in which any of said at least two functionalities can be assumed by any number of said controllable sensor elements, and in which any other of said at least two functionalities can simultaneously be assumed by any number of the remaining controllable sensor elements.

5. A capacitive sensing device according to claim 1 in which said at least two functionalities which are available or selectable for the at least a number of sensor elements comprise a driving functionality in which a sensor element acts as a transmitting element ($1_{2,3}, 1_{2,4}, 1_{2,6}, 1_{2,7}$), and a sensing functionality in which a sensor element acts as a receiving element ($1_{2,5}$).

6. A capacitive sensing device according to claim 1 which at least a number of the controllable sensor elements can be controlled to assume a third functionality.

7. A capacitive sensing device according to claim 6, in which all sensor elements are operable in all said three functionalities and can thus be controlled to have any of at least three different functionalities.

8. A capacitive sensing device according to claim 7, in which said third functionality is an insulating functionality in which a sensor element is inactive, or not selected.

9. A capacitive sensing device according to claim 8, in which all sensor elements are controllable, and in which each sensor element can be controlled to act as a receiving element, a transmitting element or to be in an insulating, inactive mode.

10. A capacitive sensing device according to claim 1 which the sensor elements are arranged in a two-dimensional matrix comprising X rows and Y columns.

11. A capacitive sensing device according to claim 1 which some of the sensor elements are selected to act as transmitting elements and some of the sensor elements are selected to act as receiving elements, the number of transmitting elements preferably exceeding the number of receiving elements, in which device the transmitting elements transmit pulsating voltage signals which are provided to the object, with the receiving elements measuring the capacitively transferred signals which are reflected back to the sensing device, the device acting as a reflective sensor (10).

12. A capacitive sensing device (11) according to claim 1 in which conducting means (12) are provided for establishing an ohmic contact between the object (4) and the sensing device (11).

13. A capacitive sensing device according to claim 12, in which the conducting means (12) act as a transmitting electrode, a number of sensor elements being selected to act as receiving elements ($1_{2,5}$), a number of sensor elements being selected to be inactive, and in which no elements are selected to act as transmitting elements.

14. A capacitive sensing device (11) according to claim 12 or 13, in which the conducting means (12) are externally arranged and connected to the sensing device or comprised by the sensing device (11).

15. A capacitive sensing device according to claim 12, in which, via the controlling means, a first operational mode in which the sensing device acts as a reflective sensor or a second operational mode in which the sensor acts as a direct sensor can be selected.

16. A capacitive sensing device according to claim 10, in which the sensor matrix is programmable, the number of sensor elements acting as transmitting elements can be controlled, and in which the positions of the transmitting elements can be controlled.

17. A capacitive sensing device according to claim 1 which the controlling means comprise a first (2) and a second (3) controlling arrangement, each providing at least one digital control signal to each of a number of sensor elements and in which said input signals, in combination, determine the functionality of the sensor elements.

18. A capacitive sensing device according to claim 17, in which the first controlling means comprise a dual shift register (2A,2B), the length of which corresponds to the number of rows (X), and in which device the second controlling means comprise a dual shift register (3A,3B), the length of which corresponds to the number of columns (Y), each of which shift registers provide digital control signals via a row interface (2C) and a column interface (3C) respectively.

19. A capacitive sensing device according to claim 18, in which each dual shift register provides two digital signals to a sensor element, one of which indicating whether the sensing functionality is selected, the other indicating whether the driving functionality is selected, and in which the functionality of a sensor element is only activated if the control signals from both dual shift registers indicate the same functionality for the sensor element.

20. A capacitive sensing device according to claim 19, in which the receiving functionality has priority over the transmitting functionality and in which, if the control signals provided to a sensor element from both shift registers indicate activation of both the sensing and the driving functionality, the sensor element will act as a receiver.

21. Use of a capacitive sensing device according to claim 1 for verification of a user wanting access to/via the sensing device through storing finger/fingertip information of an entitled user and comparing said stored finger/fingertip information with finger/fingertip information of a user attempting access.

22. A method of sensing topological variations in the structure of an object received adjacent a sensing surface of a capacitive sensing device including a number of controllable sensor elements arranged in at least two dimensions, characterized in that it comprises:
    providing control signals by means of which at least one of the sensor elements is controlled to have the functionality of a receiving element and at least one of said sensor elements is controlled to have the functionality of a transmitting element,
    generating capacitive or conductive signal(s) to the object via said transmitting element(s),
    detecting the capacitance between a number of different locations on the object and different receiving elements,
    using the capacitive signals received in the receiving elements for determining the topological pattern in the structure of the object,
    generating an (analogue) output signal describing the topological pattern.

23. The method of claim 22, in which the at least one of said sensor elements is activated to have the functionality of a receiving element, while simultaneously the at least one of said sensor elements is activated to have the functionality of a transmitting element.

24. The method of claims 22 or 23, further comprising the step of storing information about the topological pattern of a first object received adjacent the sensing device at a first occasion.

25. The method of claim 25, further comprising the steps of:
    using the sensing device to determine the actual topological pattern of an object received adjacent the sensing device at another, later, occasion,
    comparing the stored information on the first object with the information on the topological pattern of the object received adjacent the sensing surface at a later occasion,
    generating an output signal indicative of the correspondence between the stored information and the actual information relating to the at a later occasion received object.

26. A data carrier with a finger/fingertip recognition device comprising:
    a sensing device (10;11) with a number of controllable sensor elements for sensing the topological variations on the structure of a finger/fingertip,
    storing means for storing finger/fingertip information of entitled user(s),
    comparing means for comparing input finger/fingertip information of a user attempting/wanting access to/by said data carrier, and
    means for generating an acceptance signal if the correspondence between stored finger/fingertip information and accessing finger/fingertip information at least reaches a predetermined level or generating a rejection signal indicating rejection of the accessing user,
    wherein the sensing device is capacitive and comprises controlling means for providing control signals to the sensor elements, at least a number of the sensor elements being controllable to assume one of at least two different functionalities, characterized in that any of said at least two functionalities can be assumed by any one of the controllable sensor elements, and any other of said at least two functionalities can be assumed by any one of the other controllable sensor elements.

27. A data carrier according to claim 26, in which any of said at least two functionalities can be assumed by any one of the controllable sensor elements, and in which any other of said at least two functionalities can simultaneously be assumed by any one of the other controllable sensor elements.

28. A capacitive sensing device (10;11) according to claim 26 or 27, in which any of said at least two functionalities can be assumed by any number of said controllable sensor elements, and in which any other of said at least two functionalities can be assumed by any number of the remaining controllable sensor elements.

29. A capacitive sensing device (10;11) according to claim 25 or 26, in which any of said at least two functionalities can be assumed by any number of said controllable sensor elements, and in which any other of said two functionalities can simultaneously be assumed by any number of the remaining controllable sensor elements.

30. A data carrier according to claim 26, which is portable and comprises a personal card or similar.

31. A data carrier according claim 26, in which said at least two functionalities of the controllable sensor elements comprise a sensing functionality in which a sensor element acts as receiving element, and a driving functionality in which a sensor element acts as a transmitting element.

32. A data carrier according to claim 26, in which at least a number of the sensor elements can be controlled to assume a third functionality.

33. A data carrier according to claim 32, in which said third functionality is an insulating functionality in which a sensor element is inactive, or not selected.

34. A data carrier according to claim 33, in which each sensor element can be controlled via the control means to assume each of said three functionalities.

35. A data carrier according to claim 26, in which a number of elements are selected to act a transmitters, and a number of sensor elements are selected to act as receivers, and in which the sensing of the topological pattern of a finger/fingertip is effected through sensing the signals reflected from a number of locations at the finger.

36. A data carrier according to claim 26, in which all sensor elements are selected to be receivers except for the sensor elements that are selected to be inactive, and in which conducting means (12) are arranged to provide an ohmic contact with the finger (4), said conducting means (12) thus acting as a transmitter and in which direct sensing is implemented.

* * * * *